Patented July 9, 1946

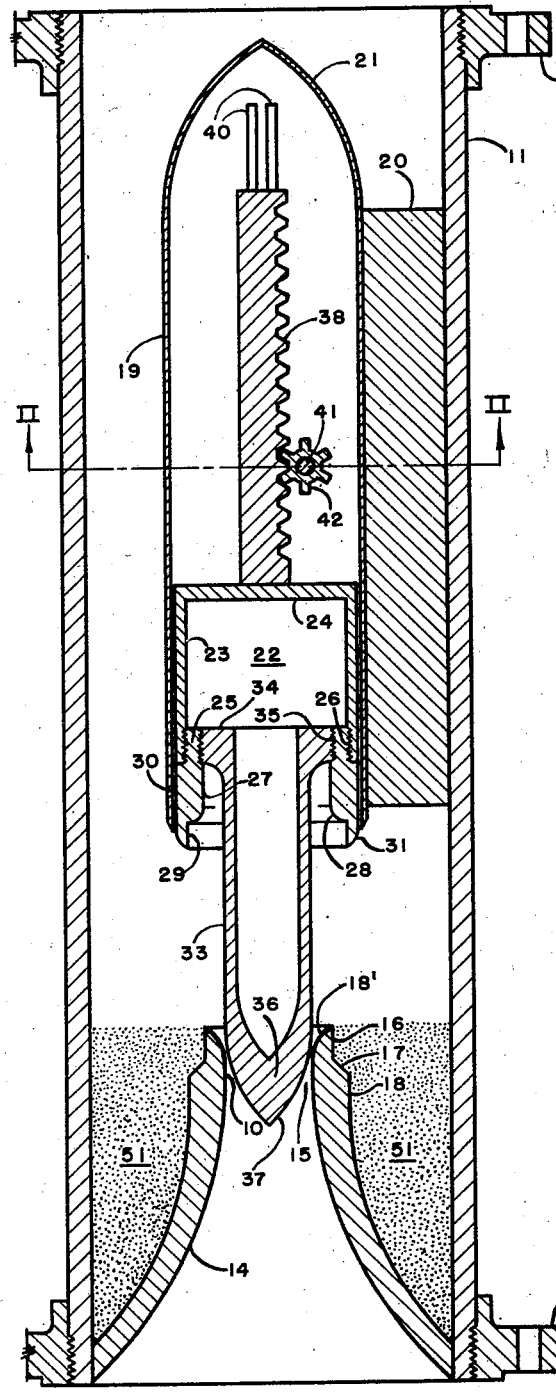
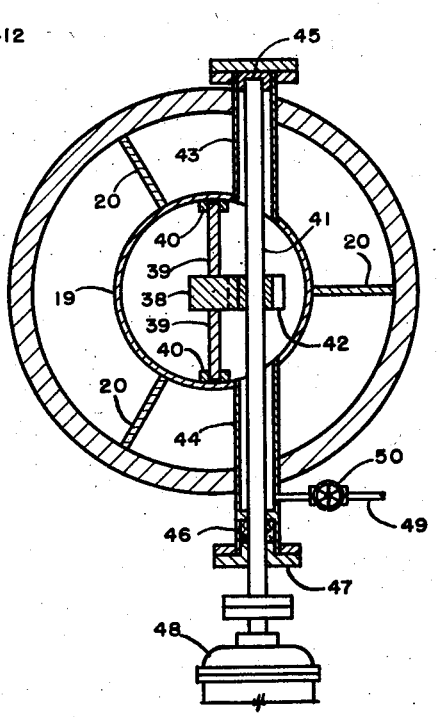
FIG. 2.
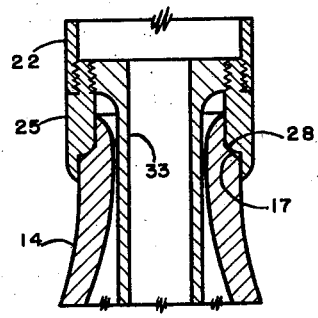
FIG. 3.
FIG. 1.
INVENTOR.
Jewell S. Palmer
BY
J D McKean
ATTORNEY.

2,403,751

UNITED STATES PATENT OFFICE 2,403,751

THROTTLING VALVE

Jewell S. Palmer, Baytown, Tex., assignor to Standard Oil Development Company, a corporation of Delaware Application March 20, 1945, Serial No. 583,758

6 Claims. (Cl. 302—1)

The present invention is directed to a valve adapted for use in apparatus handling abrasive materials.

It is an object of the present invention to devise a valve adapted to be used for throttling a stream comprising abrasive materials and which is provided with seating surfaces which are not subjected to abrasion by the stream.

A further object of the present invention is the provision of a valve adapted for throttling a stream and provided with surfaces defining the opening through which the throttled stream flows and other surfaces independent thereof which may be engaged to terminate completely fluid flow through the valve.

A further object of the present invention is the provision of a throttling valve adapted to be arranged in a conduit carrying a stream of abrasive material and which will remain operable for long periods of time.

An additional object of the present invention is the provision of a valve in which the surfaces cooperating to form a fluid-tight seal are protected from abrasion by material flowing through the valve and in which other surfaces arranged to minimize the abrasion of the stream flowing through the valve are employed to adjust over a wide range the rate of flow through the valve.

Other objects and advantages of the present invention may be seen from a reading of the following description taken in conjunction with the drawing in which Fig. 1 is an elevation, partly in section, of an embodiment of the present invention showing the valve in a throttling position;

Fig. 2 is a view taken along line II—II of Fig. 1; and

Fig. 3 is a fragmentary view of a portion of the device of Fig. 1 showing the seating surfaces in contact to illustrate the relative positions of the several parts when the valve is closed.

Turning now specifically to the drawing, a tubular member 11, which forms the body of the valve, is provided with suitable means, such as flanges 12 and 13, for connecting it in a conduit carrying a flowing stream. It is usually desirable to arrange body 11 with its longitudinal axis substantially vertical and flange 12 at its upper end and flange 13 at its lower end, as shown in the drawing. It will be understood, however, that the valve body 11 may be positioned so that its longitudinal axis is not vertical and many of the advantages of the present invention retained.

Arranged within the body 11 is a nozzle 14 with a throat 15 pointing in the upstream direction and its outside diameter secured to the inside wall of body 11 at a point adjacent flange 13. In the drawing, the nozzle is shown as having an interior conoidal surface 10 approximating in shape that formed by revolving a quarter ellipse around the axis of the throat.

Arranged in valve body 11 upstream from nozzle 14 is a mounting means adapted for carrying the movable portions of the valve. The mounting means includes a tubular member 19 secured in body 11 by radially extending supporting fins 20. A conoidal surface 21 is secured to the upper edge of tubular member 19 and forms a cover to prevent the entrance of the stream into the upstream end of member 19.

A movable valve element 22 is arranged within body 11 for longitudinal movement therein. The upper portion of valve element 22 is formed by a tubular portion 23 whose outside surface fits slidably within the interior surface of member 19. An upper wall member 24 joins the upper edges of the tubular member 23 and closes the upper end of element 22 in a fluid-tight manner. Secured to the lower edge of member 23 by conventional fastening means, such as screw threads 26, is annulus 25.

Annulus 25 defines an inside wall having an upper portion of general tubular form designated by numeral 27 and of such dimensions as to fit slidingly over surface 16 of nozzle 14. The lower edge of surface 27 joins curved seat 28. Seat 28 is arranged to cooperate with seat 17 of nozzle 14 so that when the two seats are brought into contact, flow of fluid through the valve is prevented. The lower edge of seat 28 joins cylindrical wall section 29 which is adapted to fit slidingly over wall section 18 of nozzle 14. The outside surface of annulus 25 includes an upper cylindrical section 30 and a lower curved section 31.

An elongated body 33 is secured to annulus 25. Body 33 is formed with an elongated tubular central portion, its upper end upset to form a circular shoulder 34 and its lower end tapering to a conoidal point 36 which has a substantially thicker wall section than the central tubular section of body 33. Circular shoulder 34 is secured to annulus 25 by mating screw threads 35. The outside conoidal surface of member 33 is designated by numeral 37 and is arranged to cooperate with curved interior surface 10 of nozzle 14 to define a passage of generally streamline shape for the stream of fluid passing through body 11.

Secured to the upper surface of wall 24 is a rack 38 to which is attached guide members 39.

Longitudinally extending members 40 are secured to the inside wall of tubular member 19 to cooperate with guide members 39 and retain the longitudinal axis of the rack parallel with the longitudinal axis of tubular member 19 and valve body 11. A shaft 41 carries a pinion 42 which is arranged to engage with rack 38 so that upon rotation of shaft 41, the rack is moved longitudinally with respect to tubular member 19. The axis of shaft 41 extends transversely with respect to the axes of member 19 and body 11 and projects through holes provided in body 19 and member 11. Contact of shaft 41 with the fluid stream passing through the annulus defined by body 11 and member 19 is prevented by tubular members 43 and 44 which pass through body 11 and are sealed thereto and have their inner ends secured in a fluid-tight manner to member 19. A bearing member 45 is secured to the outer end of tubular member 43 and is arranged to receive one end of shaft 41, while a packing gland 46 and a packing gland follower 47 are arranged around the end of shaft 41 adjacent the outer end of tubular member 44 to prevent leakage around the shaft. The end of shaft 41 projects beyond packing gland 46 and tubular member 44 and is adapted to be connected to a suitable means for producing rotation; in the drawing, the rotating means is shown as an electric motor 48 but it will be understood that this specific rotating means is shown only for purposes of illustration, and other means, for example, a hand crank may be provided for rotating shaft 41.

In order to prevent the passage of abrasive materials upwardly in the space between tubular member 19 and member 23 and thence outwardly in the space between shaft 41 and tubular member 44, an inlet line 49 controlled by valve 50 is provided to allow the injection of a suitable fluid, such as air and stream, to maintain pressure within member 19 slightly in excess of the pressure below its lower edge so that the flow of material between members 19 and 23 will always be downwardly.

As has been heretofore stated, the mechanism of the present invention is particularly adapted for use in a conduit carrying a suspension and provides a means for regulating the volume of flow through the conduit over a wide range. The device is constructed to minimize abrasion of the several parts thereof and the seating surfaces employed to close the valve in a fluid-tight manner are protected from direct contact with the abrasive material being carried in the stream passing through the valve body.

When employing the valve of the present invention in a conduit through which a fluid vehicle carrying suspended solid material is forced to flow, it is desirable to place it in a vertical section of the conduit with flange 12 uppermost as indicated in the several figures of the drawing, with the stream flowing downwardly through the valve body. When the device is arranged in this manner the stream, including the fluid vehicle and the suspended solid matter, flows downwardly in the annulus defined by body 11 and member 19 and its direction of flow then changed so that it passes through the throat 15 of nozzle 14. A minimum resistance to the flow of the stream is presented by curved surface 31 of annulus 25 and throat surface 18' of member 14. It will further be seen that the upper seat 28 is entirely out of the path of flow of the stream. After a stream of fluid vehicle and suspension flows through the device for a relatively short time, suspended solids settle out of the stream in sufficient amounts to fill up the dead space between the outer surface of member 14 and the inner surface of body 11 to such an extent as to cover completely seat 17 and protect it from the moving suspended solids. In Fig. 1 the suspended material is designated by 51 and is shown completely filling this dead space. Accordingly, both the upper seating surface 28 and the lower seating surface 17 are shielded from moving solids and retain their dimensions allowing them to be brought into contact and form a fluid-tight seal even after the device has been placed in operation over a long interval of time.

It will also be seen that the area of flow through throat 15 of member 14 may be altered over a wide range by moving conoidal point 36 vertically with respect to the throat of member 14. The portions of members 14 and 33 which direct the flow of the stream are relatively thick and a substantial portion of material from these parts may be abraded by the stream before they require replacement. It will be understood that the point 36 and throat 15 simply cooperate to allow throttling of the valve to any suitable flow area and the abrasion of these surfaces does not prevent the the closing of the valve in a fluid-tight manner by bringing surface 28 in contact with seat 17.

Having fully described and illustrated the present invention, what I desire to claim is:

1. A valve comprising, in combination, a tubular body defining a central passage, a wall member shaped in the form of a nozzle arranged in said central passage with its smaller throat end pointing in the upstream direction within said passage and its large diameter end secured to the inner wall of said tubular body and defining a valve seat on its outside surface spaced slightly downstream from the upstream end of said member, a movable member defining a conoidal surface with a maximum diameter slightly less than the minimum diameter of the throat of said wall member, and an annulus upstream from the conoidal surface arranged to cooperate with the seat of the said wall member to form a fluid-tight seal, and a mounting means arranged to support said movable member at a point upstream from the wall member and adapted to move it along the longitudinal axis of the tubular body to bring the seat of said movable member into contact with the seat of said wall member.

2. A valve comprising, in combination, a tubular body member defining a central passage, a nozzle member having the inner surface adjacent the smaller end defining a throat, its outer surface defining a seat spaced away from the smaller end and its larger end secured to the tubular body in a fluid-tight manner with the throat pointing in the upstream direction in said central passage, a movable member defining a body having a cylindrical surface with a maximum diameter no greater than the minimum throat diameter of said nozzle member and a conoidal point and an annular portion spaced away from the point and defining a seat adapted to cooperate with the seat of the nozzle member to form a fluid-tight seat, a mounting means mounted on said tubular body member and arranged to support said movable member with said conoidal point downwardly and to move said movable member along the longitudinal axis of the body member to engage its seat with the seat of said nozzle member.

3. A device in accordance with claim 2 in which the suspending means includes a rack secured to said movable member and a pinion adapted to move said rack parallel with the longitudinal axis of the tubular body.

4. A valve comprising, in combination, a tubular valve body, a nozzle member with its inner surface defining a throat, its outer surface defining a seat spaced from its smaller end and its larger end secured to the tubular valve body with the throat pointing in the upstream direction and the axis of the nozzle coinciding with the axis of the tubular body member, a movable member defining a downwardly projecting annular portion with a valve seat on the interior of said annular portion adapted to cooperate with the valve seat defined by the outer surface of said nozzle portion to form a fluid-tight seal and a downwardly projecting tubular portion of a maximum diameter less than the minimum diameter of the throat of the nozzle body terminating in a conoidal point below said annular portion, and with the axes of the tubular portion and the annular portion concentric with that of the tubular body, a mounting means arranged to support said movable member above the nozzle member and to move it downwardly with the tubular portion within the throat of the nozzle member.

5. A device in accordance with claim 4 in which the suspending means includes a rack secured to the movable body and a pinion mounted on a shaft suspended from said valve body and adapted to move the rack along the longitudinal axis of the body.

6. A device in accordance with claim 4 in which the mounting means includes an enclosed housing and means for flowing a fluid medium therethrough.

JEWELL S. PALMER.